HAYS & VANCUREN.
Corn-Planter.
No. 28,367.
Patented May 22, 1860.
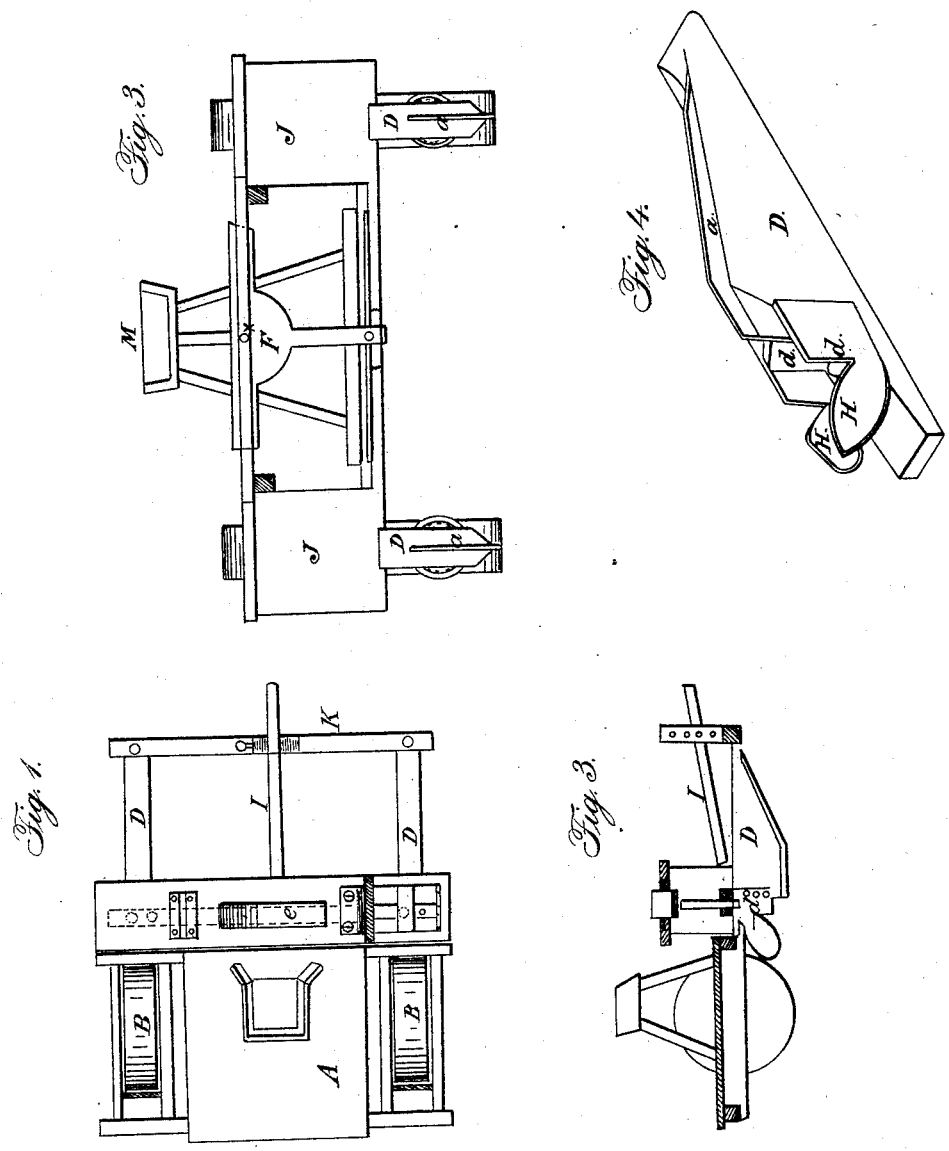
Witnesses:
Inventor:

UNITED STATES PATENT OFFICE.

ABIEL HAYS AND JAS. VANCUREN, OF CHENOA, ILLINOIS.

IMPROVEMENT IN CORN-PLANTERS.

Specification forming part of Letters Patent No. 28,367, dated May 22, 1860.

*To all whom it may concern:*

Be it known that we, ABIEL HAYS and JAMES VANCUREN, of Chenoa, in the county of McLean and State of Illinois, have invented certain new and useful Improvements in Corn-Planters; and we do hereby declare that the following is a full, clear, and exact description of the same, reference being had to the accompanying drawings, and to the letters of reference marked thereon.

The nature of our invention consists in constructing and arranging those parts of the machine which will be particularly described, substantially as will be set forth.

In the annexed drawings, Figure 1 is a plan of the machine. Fig. 2 represents a section. Fig. 3 represents a front view. Fig. 4 is a perspective of the bottom of one slide.

In the figures, A represents a frame, which rests upon two wheels, B B. This frame may be made of any desirable size, and it is provided with a platform between the wheels, upon which is erected a driver's seat, M, as represented.

D D represent two slides, which serve to sustain the seed-box, serve as colters, and serve as seed spouts and coverers. One of these slides is represented fully in Fig. 4, which shows a bottom perspective of it.

*a a* represent cutters, which are secured upon the bottom of these slides. The slides may be made of wood; but the cutters are made of thin metal. In the rear part of these slides are provided openings through which the seed fall and are guided to the ground.

H H represent coverers, which are formed or secured to the slides behind the seed-spouts.

J J' represent two seed-boxes, which are connected together by means of a bar which rests upon the two slides D D. These boxes are placed over the slides in such a manner that when grain falls from them it falls into the seed-spouts in the slides.

K is a bar which connects the two slides together in front.

I represents a rod, which connects at its rear with the bar connecting the seed-boxes, and which passes between two supports or standards on the bar K. Said rod is stationed between these two supports by means of a pin, which confines it in any given position. The draft being on this rod when the machine is in motion, it will be seen that when the forward end of the rod is raised the rear of the slides will have a tendency to rise from the ground, and that when the said end of the rod is lowered the rear of the slides will run deeper into the ground. The frame A is connected to the bar on which the seed-boxes rest by means of hinges or staples, which allow the slides to be adjusted without affecting the position of the said frame. The seed-slide *e* is operated backward and forward by means of the treadle F, which is pivoted at *x*, and which has a stem which connects with the said seed-slide *e*.

Having thus fully described our invention, what we claim as new, and desire to secure by Letters Patent, is—

The arrangement of the slides D D, provided with cutters *a a*, with seed-openings *d* in their rear, and with coverers H H, when the same are used in connection with the frame A, seed-boxes J J, seed-slide *e*, treadle F, and lever I, substantially in the manner and for the purpose specified.

ABIEL HAYS.
JAMES VANCUREN.

Witnesses:
ALONZO HUNTOON,
OWEN MARKEY,
THOMAS SANDHORN.